United States Patent

[11] 3,563,154

| [72] | Inventor | Donovan E. Henning<br>Box 38 R.R. #1, Egan, Ill. 61026 |
|---|---|---|
| [21] | Appl. No. | 744,534 |
| [22] | Filed | July 12, 1968 |
| [45] | Patented | Feb. 16, 1971 |

[54] TRIPOD MOUNTING ATTACHMENT FOR CAMERAS
6 Claims, 5 Drawing Figs.

[52] U.S. Cl.................................................. 95/86,
151/41.75, 248/177
[51] Int. Cl................................................. G03b 17/56
[50] Field of Search........................................ 95/86;
151/41.75; 248/177, 187, 316; 85/(Inquired);
287/(Inquired); 248/(Inquired); 151/(Inquired)

[56] References Cited
UNITED STATES PATENTS

| 1,357,639 | 11/1920 | Kroedel........................ | 248/187 |
| 2,824,503 | 2/1958 | Weiss........................... | 95/86 |

Primary Examiner—John M. Horan
Assistant Examiner—Fred L. Braun
Attorney—Andrew F. Wintercorn ABSTRACT: A camera mounting plate that is easily attachable to a camera has a nut affixed onto its lower side to receive the usual screw on a tripod for fastening the camera thereon. The plate is rectangular and has an upwardly projecting flange on one edge with two spaced inwardly projecting ears on it to engage over and grip an edge portion of one wall of the camera case. The camera case has an outwardly projecting spring catch which snaps over the flange between the ears to fasten the camera detachably onto the mounting plate. The spring catch is used to fasten a hinged cover in closed position on the camera when the mounting plate is detached therefrom.

PATENTED FEB 16 1971
3,563,154
FIG. 1
FIG. 2
FIG. 3
FIG. 4
FIG. 5
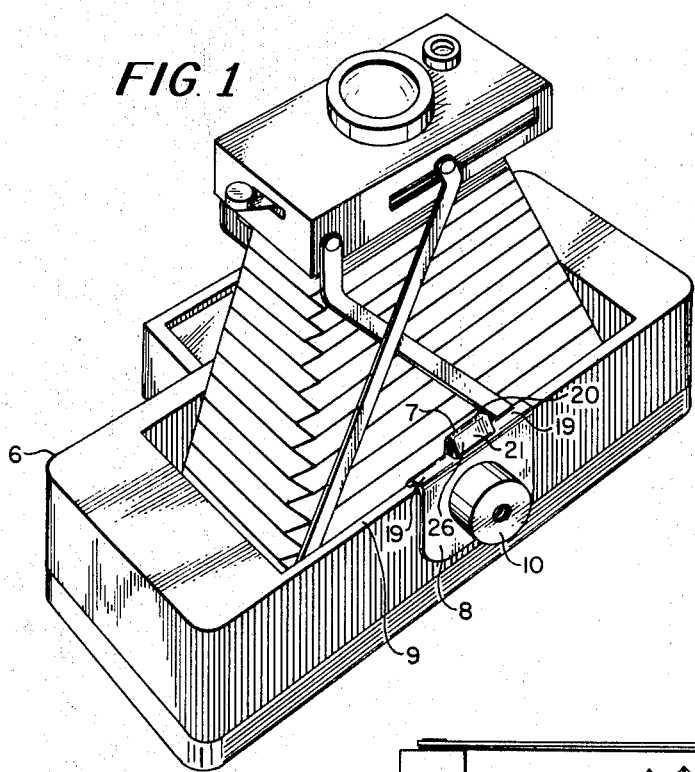
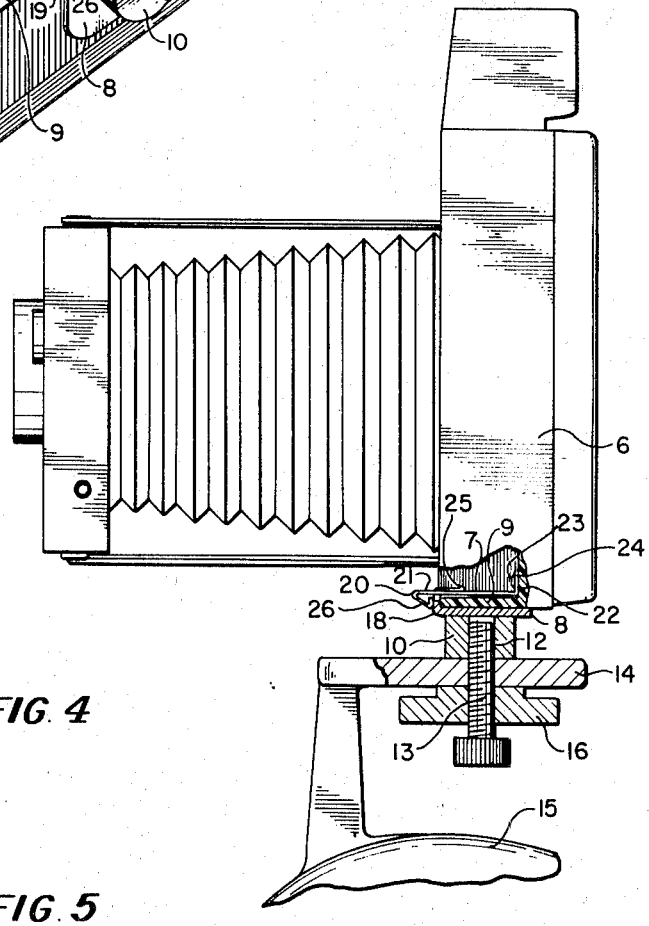
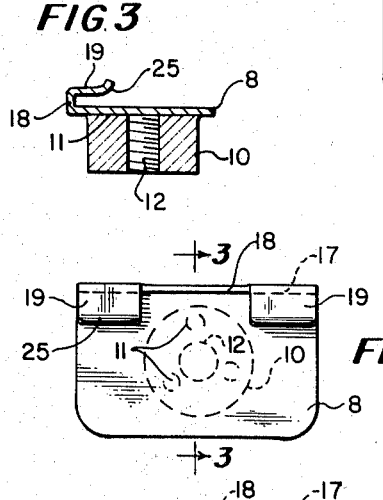
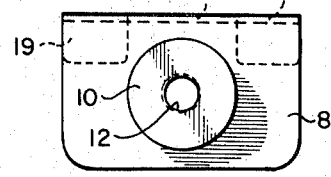
INVENTOR:
DONOVAN E. HENNING
Andrew F. Wintercorn
Atty.

TRIPOD MOUNTING ATTACHMENT FOR CAMERAS

This invention relates to a new and useful tripod mounting attachment for cameras, and has for its principal object the provision of a metallic mounting plate with a screw threaded nut on one side thereof adapted to receive the usual screw on a tripod in the conventional manner and having on its other side a longitudinally extending flange along one edge for locating abutment with one edge portion of the bottom wall of the camera case, this flange being cutaway between two retaining ears that are spaced the same as ears on the lock plate on the detachable hinged cover of the camera thereunder to receive the bottom wall of the camera thereunder while a wedge-shaped head provided on the outer end of a spring clip, otherwise used in connection with the lock plate just mentioned to fasten the cover of the camera, riding over the cutaway portion of the flange snaps into place behind it to fasten the tripod mounting plate just as securely in place as the lock plate on the cover is secured using this same spring clip in a similar manner. Thus, the purchaser of a camera that is devoid of any tripod mounting can easily remedy the situation by the purchase at low cost of this novel mounting plate so he can mount his camera on a tripod.

The invention is illustrated in the accompanying drawing, in which:

FIG. 1 is a perspective view of a camera onto the case of which the improved mounting plate of my invention has been attached and secured in place by means of the aforementioned spring clip;

FIG. 2 is a side view of the camera mounted on a tripod, only the upper end portion of which is shown, the mounting plate of my invention being shown in section along with a portion of the camera case and the nut on said plate, to better illustrate the construction and mode of operation, and FIGS. 3, 4 and 5 show the mounting plate full size, these views being a section on the line 3-3 of FIG. 4, a top view, and a bottom view, respectively.

The same reference numerals are applied to corresponding parts throughout the views.

The well known Land cameras, in their more expensive models, have metal case with a screw threaded socket in one side thereof to permit mounting these cameras on tripods, similarly as most other cameras are now mounted. In the cheaper models, however, where the case cover is hinged to the case and removably in place by the engagement of two ears on a lock plate on one side of the case 6 on opposite sides of the outer end of a spring clip 7, there is no provision made for mounting the camera on a tripod, and that obviously prevents doing the kind of photographic work with these cameras that requires the use of a tripod. With the metallic mounting plate 8 of my invention, which the purchaser of one of these cheaper Land cameras can buy at a low enough cost, and which is designed for quick attachment to and removal from the case using the outer end of the same spring clip 7 otherwise used for fastening the hinged and removable cover onto the case, these cameras can be mounted on tripods just as well as the more expensive models. In fact, since the clip 7 is located at the middle of the bottom wall 9 of the case 6 the mounting plate 8 is assured of central location with respect to the case for good balance.

The mounting plate 8 has a cylindrical nut 10 suitably affixed to one side thereof, as indicated at 11, this metal part being a screw machine part manufacturable at very low cost and provided with an axial hole 12 threaded to receive the usual screw 13 for fastening the camera onto the bracket 14 on the top of a tripod 15. The screw is adjustable with respect to the bracket 14 to serve different cameras, and a large diameter lock nut 16 is provided on the screw and has abutment with the bottom of the bracket 14 and can be set by hand to lock the parts in adjusted position.

Plate 8, which is a formed sheet metal stamping manufacturable at very low cost, has a longitudinally extending vertical flange 17 on one edge portion thereof, the middle portion 18 of which is cutaway to a slightly lower elevation than the pair of inwardly bent ears 19 to come slightly below the level of the leading edge 20 of a generally triangular shaped tooth 21 provided on the outer end of the leaf spring clip 7, the clip lies flat against the bottom wall 9 of the case 6 and is secured to the back wall 22 by a rivet 23 entered through a hole in the right angle bent attaching end portion 24 of the clip. Hence, as the upwardly bent free ends 25 of the two ears 19 have the bottom wall 9 of the case slide into place under the ears to locate the mounting plate squarely with respect to the case, the inclined lower face 26 on the tooth 21 on the outer end of the spring clip 7 rides over the cutaway middle portion 18 of the flange 17, flexing the spring clip upwardly until the bottom wall 9 has moved all the way home under the ears 19, whereupon the end 21 of the clip snaps down into place behind the flange 17 at 18 to fasten the mounting plate securely to the case 6 and yet enable one easily to remove the camera again by simply applying upward pressure with a finger on the outer end 21 of the spring clip to unlock it from the plate. As seen in FIG. 1, the end portion 21 of the spring clip 7 is nearly as wide as the cutaway portion 18 of the plate 8 and has easy working clearance between the ears 19.

In operation, one can attach the mounting plate 8 to the case 6 of the camera first and then mount the camera on the tripod by means of the screw 13 threading in nut 10, but the chances are that most users will prefer to leave the mounting plate on the tripod once it has been properly secured thereon as that eliminates a time consuming operation whenever the camera is to be mounted on the tripod and also eliminates the likelihood of the mounting plate being mislaid or lost, as could easily happen with such a loose part, especially since it cannot be left on the camera, for obvious reasons. Also, many users of cameras having tripod sockets will find this attachment useful as it allows quicker and easier mounting and dismounting of the camera which especially in commercial work using Polaroids, is an important factor.

It is believed the foregoing description conveys a good understanding of the object and advantages of my invention. The appended claims have been drawn to cover all legitimate modifications and adaptations.

I claim:

1. A tripod mounting attachment for a camera having a case with an outwardly projecting substantially horizontal spring catch disposed substantially parallel to one wall thereof, said attachment comprising a substantially horizontal plate, one side of which flatly engages the outside of said wall, said plate having a substantially vertical flange on one edge portion thereof having locating abutment with one edge of said wall adjacent said catch, said flange having a pair of spaced substantially horizontal ears thereon having gripping engagement over the edge portion of the aforesaid wall of said case on opposite sides of said catch while the latter has releasable retaining engagement over the flange so that said ears limit lateral movement of said plate relative to said catch, and a nut on the other side of said plate adapted for threadedly engaging a fastener screw on a tripod.

2. A structure as set forth in claim 1, wherein the inner ends of said ears are curved upwardly away from said plate to facilitate entry of the case wall therebeneath.

3. A tripod mounting attachment for a camera having a case with a removable cover, said case having an outwardly projecting substantially horizontal spring catch disposed substantially parallel to one wall thereof and adapted to cooperate with the cover to secure it releasably in closed position on the case, said attachment comprising a substantially horizontal plate, one side of which flatly engages the outside of said wall, said plate having a substantially vertical flange on one edge portion thereof having locating abutment with one edge of said wall adjacent said catch when the cover is removed, said flange having a pair of spaced substantially horizontal ears thereon having gripping engagement over the edge portion of the aforesaid wall of said case on opposite sides of said catch while the latter has releasable retaining engagement over the flange so that said ears limit lateral movement of said plate relative to said catch, and a nut on the other side of said plate adapted for threadedly engaging a fastener screw on a tripod.

4. A structure as set forth in claim 3, wherein the inner ends of said ears are curved upwardly away from said plate to facilitate entry of the case wall therebeneath.

5. As an article of manufacture, a metal plate for attachment to a camera for mounting the same on a tripod, said plate being flat and generally rectangular and having a bottom surface and a top surface and having secured to the center of the bottom surface a nut for threadedly receiving a fastener screw on a tripod, there being an elongated flange on one edge thereof projecting upwardly at right angles thereto from the top surface for locating abutment with the edge portion of one wall of the case of a camera, and a pair of spaced ears projecting inwardly from and in a predetermined vertically spaced relation to the upper edge of said flange which is straight and disposed in spaced parallel relation to the top surface of said plate to receive thereunder the aforesaid wall of said case.

6. An article of manufacture as set forth in claim 5 wherein the inner end portions of said ears are curved away from said plate for easier entry therebeneath of the wall of said case.